United States Patent
Roland et al.

(10) Patent No.: US 9,238,395 B2
(45) Date of Patent: Jan. 19, 2016

(54) REAR WHEEL SUSPENSION, AND A MOTOR VEHICLE

(71) Applicants: Swedish Advanced Automotive Business AB, Vänersborg (SE); BENTELER AUTOMOBILTECHNIK GmbH, Paderborn (DE)

(72) Inventors: Magnus Roland, Vänersborg (SE); Gunnar Burénius, Österås (NO)

(73) Assignees: Swedish Advanced Automotive Business Machines AB, Vanersborg (SE); Bentler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 14/379,020

(22) PCT Filed: Feb. 14, 2013

(86) PCT No.: PCT/EP2013/052935
§ 371 (c)(1),
(2) Date: Aug. 15, 2014

(87) PCT Pub. No.: WO2013/127635
PCT Pub. Date: Sep. 6, 2013

(65) Prior Publication Data
US 2015/0014956 A1    Jan. 15, 2015

(30) Foreign Application Priority Data
Feb. 29, 2012 (SE) .................................. 1250185

(51) Int. Cl.
*B60G 21/05* (2006.01)
*B60G 21/00* (2006.01)

(52) U.S. Cl.
CPC ............ *B60G 21/051* (2013.01); *B60G 21/007* (2013.01); *B60G 2200/21* (2013.01);
(Continued)

(58) Field of Classification Search
CPC ............... B60G 21/051; B60G 21/007; B60G 2200/46; B60G 2200/21; B60G 2200/341; B60G 2200/3415; B60G 2206/20; B60G 2200/342; B60G 2202/136; B60G 2200/462; B60G 2204/148
See application file for complete search history.

(56) References Cited

U.S. PATENT DOCUMENTS 2,226,047 A * 12/1940 Borgward ..................... 180/353
3,006,429 A * 10/1961 Polhemus et al. ..... 280/124.116
(Continued)

FOREIGN PATENT DOCUMENTS

DE      4110571 A1   12/1991
DE   102007007439 A1    8/2008
(Continued)

*Primary Examiner* — Paul N Dickson
*Assistant Examiner* — Timothy Wilhelm
(74) *Attorney, Agent, or Firm* — MKG, LLC

(57) ABSTRACT

A rear wheel suspension including first and second suspension devices carrying a right and left, respectively, rear wheel rotating in a wheel plane forming a toe angle with respect to a longitudinal axis and a camber angle with respect to a vertical axis. A transversal beam connects the first and the second suspension device. Each suspension device includes a wheel spindle housing, defining a wheel center, and a leading link and a trailing link connected to the vehicle body. The transversal beam permits bending for vertical loads to provide the suspension devices a deflection to adjust the toe and camber angles such that the changes of the camber angles when the wheel planes converge towards an upper point above the wheel center connect to a controlled adjustment of the toe angles such that the wheel planes converge directionally towards a rear point located rearwards of the wheel center.

14 Claims, 6 Drawing Sheets

(52) U.S. Cl.
CPC ..... *B60G2200/341* (2013.01); *B60G 2200/342* (2013.01); *B60G 2200/3415* (2013.01); *B60G 2200/46* (2013.01); *B60G 2200/462* (2013.01); *B60G 2202/136* (2013.01); *B60G 2204/148* (2013.01); *B60G 2206/20* (2013.01)

(56) References Cited

U.S. PATENT DOCUMENTS

| | | | |
|---|---|---|---|
| 4,085,945 A * | 4/1978 | Bicht et al. ................. | 280/788 |
| 4,458,917 A * | 7/1984 | Maru et al. ............. | 280/124.106 |
| 4,781,364 A * | 11/1988 | Finn et al. .................. | 267/260 |
| 4,802,689 A * | 2/1989 | Hoffmann et al. ......... | 280/124.1 |
| 4,903,984 A * | 2/1990 | Kajiwara et al. .......... | 280/5.515 |
| 5,597,175 A | 1/1997 | Tuan | |
| 6,179,328 B1 * | 1/2001 | Kawagoe et al. ............. | 280/788 |
| 6,672,605 B2 * | 1/2004 | Basnett .................. | 280/124.128 |
| 8,172,244 B2 * | 5/2012 | Winter .................. | 280/124.107 |
| 8,419,030 B2 * | 4/2013 | Lange et al. ........... | 280/124.116 |
| 8,733,771 B2 * | 5/2014 | Johnson et al. ........ | 280/124.106 |
| 2014/0262586 A1 * | 9/2014 | Dada et al. .................... | 180/252 |

FOREIGN PATENT DOCUMENTS

| | | |
|---|---|---|
| DE | 102007031165 A1 | 1/2009 |
| EP | 2374639 A1 | 4/2010 |
| FR | 2474963 A1 | 8/1981 |
| FR | 2698825 A1 | 12/1993 |
| JP | 62-029406 A | 7/1987 |

* cited by examiner

REAR WHEEL SUSPENSION, AND A MOTOR VEHICLE

FIELD OF THE INVENTION

The present invention refers generally to the suspension of the rear wheels of a motor vehicle, especially passenger cars, sport utilities (SUVs) and light trucks. More specifically, the present invention refers to a rear wheel suspension and to a motor vehicle including such a rear wheel suspension.

BACKGROUND

The rear wheel suspension for a motor vehicle connects the architecture of the sprung vehicle mass to the architecture of the non-sprung and rotating rear wheels and associated tires, the rear tire-wheel assemblies. Furthermore, the rear wheel suspension controls the motion pattern of the rear tire-wheel assemblies with respect to the external impact from the road as well as to the internal impact from the propelling, braking and steering as initiated by the driver through the engine-transmission system, the braking system, the steering system and the rear and forward wheel suspensions.

The overall controllability in terms of steering, propelling and braking of the vehicle is closely related to the motion pattern of the four tire-wheel assemblies. The motions of the front tire-wheel assemblies are normally controlled by two independent front wheel suspensions while for the rear tire-wheel assemblies the rear wheel suspension as defined above controls the two rear tire-wheel assemblies by a multi-link beam suspension where the two suspension devices, one for each tire-wheel assembly, connect to each other through a transversal beam with special characteristics, where four longitudinal links, two on each side, connect the left and the right suspension devices to the vehicle body.

The front wheel suspensions and the rear wheel suspension together with the four tire-wheel assemblies constitute the un-sprung masses connected to the vehicle's sprung mass to which the driver is connected. During the vehicle's motion of combined forward running (surge), bounce, sway/veer, roll, pitch and yaw, these motion patterns and their time derivatives in all directions are guided such that a normal driver's capability of control enables the entire synthesized motion pattern of the vehicle to be fully controlled in a secure manner from the capability of the suspension to transform the superimposed useful control signals and disturbing noise, where the objectively measurable disturbing noise frequently overpowers the useful control signal, such that the noise signal is transformed into well defined perceived control signals in order to amplify useful control signals.

Vehicles are complex systems with human beings in the control loop. Although the dynamic behavior of vehicles in response to drivers' input may be simulated or measured, this understanding does not determine the issue of 'good handling' unless complemented with the understanding of how human beings work as control systems and how a driver's brain works in vehicle control.

It is therefore important to provide a system mechanization with a synthesized operation of the communication loop defined as "fail operate, fail operate, fail safe" normally used in safety critical systems such as Control Configured Vehicles (CCV). This requires a communication loop of quadruple redundancy and a dissimilar back up system, where the command media in our case is the entire vehicle-suspension architecture. The redundancy in the command media is here to be seen as flows of information of superimposed layers of power spectra where the driver's sensory system has capability to sense concurrently ongoing motion patterns in a similar way as our eye concurrently can perceive several colors or our ears concurrently can perceive several tones in music. The spectra as characterized by different frequencies should be in harmony with each other, i.e. redundant signals should be coherent.

SUMMARY

An object of the present invention is to provide an improved rear wheel suspension for a motor vehicle. Especially it is aimed at a rear wheel suspension having a high lateral stiffness. More precisely, the object of the present invention is to provide a rear wheel suspension, which aims for maximized traction. Still more precisely, the object of the present invention is to maximize a homogeneous stress-energy-tensor in the contact between the tire-wheel assembly and the road when moving over the road topology. In addition, it is an object of the present invention to provide a motor vehicle, which aims for maximized human compatible control for normal as well as for critical unexpected events.

A further object of the present invention is to provide a rear wheel suspension permitting control of the structural bonding of the tire to road interaction and to control the different cross coupled inertial systems, which the vehicle is composed of.

A further object of the present invention is to meet a set of functions to maximize traction power at every particular driving condition and to maximize the compatibility to human capability to control the interaction between driver, vehicle and road at the limit of adhesion when the reciprocation of dipole bonding, as an extended view of Van der Waals forces, changes between structural intermolecular bonding and loss of this structural intermolecular bonding.

A further object of the present invention is to meet a set of functions to maximize traction power at every particular driving condition and to maximize the compatibility to human capability to control the interaction between driver, vehicle and road for driving conditions when sprung body inertia has an impact on the driver vehicle control loop as impacted by the means of cross coupled roll and yaw motion.

These and further objects are achieved by the rear wheel suspension initially defined which is characterized in that the transversal beam is configured to permit a bending to provide the first and second suspension devices a deflection in a direction along the longitudinal axis to adjust the first and second, respectively, toe angle, and in a direction along the vertical axis to adjust the first and second, respectively, camber angle such that the changes of the first and second camber angles, when the first and second wheel planes converge towards an upper point above the wheel centre of each of the first and second suspension devices, connect to a controlled adjustment of the first and second toe angles such that the first and second wheel planes converge directionally towards a rear point located rearwards of the wheel centre of each of the first and second suspension devices.

According to the present invention, each of the left and right rear tire-wheel assemblies, each of which connects to the respective wheel spindle and to the first and second suspension devices, respectively, connects to a longitudinal trailing link and a longitudinal leading link guiding each suspension device to a well defined pattern of motion with reference to the vehicle body. The two suspension devices connect to each other through the transversal beam with a configuration permitting the transversal beam to bend as described herein and in the appended claims.

The transversal beam according to the present invention is thus configured to permit a determined bending in a determined direction. The bending of the transversal beam will change the camber angle and as a consequence of this change also change or adjust the toe angle of the rear wheels thanks to the configuration and to the fact that the transversal beam is attached to the first and second suspension devices. The change of the camber angle is thus connected to or coupled to an adjustment of the toe angle. The camber angle may be negative in a static state and in a normal design load position. The toe angle may be at toe-in in the static state and in the normal design load position, for instance a toe-in of 0.05-0.25°, such as a total axle toe-in of 0.3°, or for each side approximately 0.15°.

The adjustment of the toe angle may include a decrease of the toe-in angle to a smaller toe-in angle, or, depending on the initial value of the toe angle, from toe-in to toe-out. It is to be noted that the toe angle also may be toe-out already in the static state or in the normal design load position. It is also to be noted that changes of the camber angle and the toe angle discussed above, are permitted by the bending of the transversal beam. Other events during driving may also result in further or superimposed changes of the camber angle and the toe angle.

Consequently, the complex pattern of motion of each rear tire-wheel assembly and their interdependent interaction of the rear wheel suspension is characterized by an almost constant track width for all modes of vertical motion concurrently with a combined accurately controlled elasto-kinematic motion of synchronized toe-out and negative camber deflection.

Thanks to the defined bending of the transversal beam a more homogeneous contact pressure between the wheel, i.e. the tire, and the road during various driving conditions will be achieved. An enhanced intermolecular structural bonding between the tire and the road will ensure a high traction power at every driving condition. In cases when the motor vehicle performance demanded by the driver cannot be supported by the structural bonding, this loss of traction will be moderated to a behavior compatible with driver control capability.

Each wheel centre may have a pattern of motion characterized by a side view swing arm angle defined by the concurrent motion upwards along the vertical axis with the motion rearwards along the longitudinal axis. This coincides with a small controlled steer effect of the axle to which each of the two wheels connect such that a desired degree of tire to ground steer effect of each tire-wheel assembly is provided by kinematics and elasto-kinematics from the topology of the links in combination with the choice of bushing stiffness in all links and with the characteristics of the transversal beam with respect to bending in camber and toe as well as in torsion as the strategic design parameters of the suspension contributing to the accurately controlled individual as well as interdependent steer effects of each of the two tire/wheel assemblies. The known approach of Geometric Ackermann steer in a front suspension is in the rear suspension of the present invention transformed into a Geometric "Inverted Ackermann" steer from the use of the special characteristics of the transversal beam, see FIG. 12.

According to an embodiment of the invention, a first relation, between the adjustment of the first toe angle and the change of the first camber angle, and a second relation, between the adjustment of the second toe angle and the change of the second camber angle, form a ratio that is maintained within a determined interval upon a vertical load on the vehicle when travelling straight ahead. Such a ratio provides a secure engagement with the road when the motor vehicle is travelling straight ahead during high speed and high acceleration and retardation. Furthermore, such a ratio contributes to a low roll resistance and thus a low fuel consumption. Advantageously, the determined interval of said ratio is 0.01 to 0.25, preferably, 0.015 to 0.1, more preferably 0.015 to 0.05, and most preferably approximately 0.035.

According to a further embodiment of the invention, said bending comprises the deflection along the longitudinal axis to adjust the directions of the first toe angle and the second toe angle to turn directionally towards a common forward point located forwards of the wheel centre when the vehicle is travelling through a curve. This bending of the transversal beam contributes to an advantageous steering of each of the first and second suspension devices providing the mentioned Geometric "Inverted Ackermann" for the lateral action of the rear wheels to be synchronized towards a centre of action common to the rear wheels and the front wheels when the motor vehicle travels through a curve.

According to a further embodiment of the invention, the transversal beam has cross-sectional shape defining a first main axis of inertia and a second main axis of inertia, the first main axis of inertia being perpendicular to the second main axis of inertia, and wherein the transversal beam has a higher bending stiffness, or higher geometric moment of inertia, for a bending around the second main axis of inertia than for a bending around the first main axis of inertia. Advantageously, the first main axis of inertia is inclined forwardly to form an acute angle to the vertical axis. Such a directed bending stiffness, or directed geometric moment of inertia, may be achieved by the transversal beam having a longer extension along the first main axis of inertia than along the second main axis of inertia. The transversal beam may have a rectangular, hexagonal, oval or other suitable cross-section. It is also possible to achieve the directed bending stiffness or directed geometric moment of inertia through other configurations of the beam.

The transversal beam is advantageously light or relatively light. According to a further embodiment of the invention, this may be achieved by the transversal beam being hollow. Furthermore, the transversal beam may be straight or curved or have any other suitable shape along the lateral axis permitting the above described determined bending.

According to a further embodiment of the invention, the transversal beam has or defines a shear centre line, which is provided at a distance from and behind the wheel centre. In addition to facilitating the above mentioned bending of the transversal beam, this configuration may also create space for the provision of drive shafts connected to the rear wheels. The shear centre line extends along the extension of the transversal beam between the wheel spindle housings.

According to a further embodiment of the invention, the trailing link extends along a trailing link direction and the leading link extends along a leading link direction, and wherein the trailing link direction and the leading link direction converge towards a transversal line forward of the wheel centre at least when the vehicle is in a normal design load position. Advantageously, said transversal line is located above the wheel centre.

It has been proven that a configuration with links in a side view were the lower trailing links and the upper leading links on each side of the transversal beam axle intersect at a point providing a side view swing arm angle generating single sided bump and steer effects such that the two interdependently interacting tire-wheel assemblies on one and the same axle at every driving condition direct the lateral traction power of the two tires towards the common centre of action the wheel suspension is securing a more homogeneous traction power spectral density capability over the entire tire contact area. When the so defined maximized traction power for the purpose of supporting the vehicle performance level as demanded by the driver action is beyond the capability of structural bonding, the loss of traction in the lateral direction is moderated by the bump induced steer effects from the utilization of the stochastic vertical road impact to a behavior compatible with driver control capability.

According to a further embodiment of the invention, the leading link extends rearwards from a leading link attachment position with respect to the longitudinal axis, the trailing link extends forwards from a trailing link attachment position with respect to the longitudinal axis, and the leading link attachment position is higher than the trailing link attachment position. Advantageously, the leading link attachment position may be positioned above the wheel centre and the trailing link attachment position is positioned below the wheel centre.

The motion of the wheel spindle axis defined by suspension topology as well as by the suspension compliances and the special characteristics of the transversal beam all of which are defined by local design parameters in the vehicle coordinate system has a super ordinate and accurately defined action to be directed towards the common centre of action which demands that the steer effect of the cornering inner and cornering outer tire-wheel assemblies have different steer effects as seen in a body fixed coordinate system. This effect is achieved from the combination of vertical impact and link topology and kinematics providing intended steer effects in combination with lateral cornering power and elasto-kinematics providing steer effects from the location of the shear centre line of the transversal beam well behind the wheel centre. The choice of topology, kinematics and elasto-kinematics are such that these superimposed motions will coincide such that the tire to road contact will maximize a homogeneous distribution of the stresses so as to maximize structural bonding and tire to road traction. Furthermore, the topology permits consideration to the requirements of synchronizing camber- and toe-variation from elasto-kinematics as a result of the special characteristics of the transversal beam. At any moment in time a vehicle with lateral acceleration follows a path defined by an instantaneous centre of an arc in a road fixed coordinate system. The radius of that arc might be changing, but at any instant the path is a specific arc. The vehicle's tires with traction capability from structural bonding during micro-seconds demands synchronization of the traction power of the two tires, such that the instantaneous actions of motion of all different suspension members will coincide for the benefit of maximized structural bonding over the entire tire contact patch during the extremely short time of duration of Van der Waals forces with a common direction synchronized towards the vehicle's instantaneous turn centre in a road fixed coordinate system. The accurately defined link topology complemented by location and elastic characteristics of the transversal beam provides adaptation to all different levels of lateral acceleration and paths of arcs such that the inner wheel and the outer wheel have functions of motion to converge directionally towards the vehicle's turn centre as defined in a road fixed coordinate system.

According to a further embodiment of the invention, each of the first and second suspension devices comprises a rear vehicle spring for carrying the part of the weight of the vehicle body and a vehicle spring attachment configured for supporting the rear vehicle spring and wherein the vehicle spring attachment is provided behind the wheel centre. Advantageously, the vehicle spring attachments may be provided on the transversal beam in the proximity of the first suspension device and the second suspension device, respectively.

According to a further embodiment of the invention, the rear wheel suspension comprises a lateral link arrangement for absorbing lateral forces acting on the vehicle body and on the rear wheels. The lateral link arrangement may comprise one of a Panhard rod, Scott-Russell-linkage or a Watt-linkage.

It is to be noted that the wheel suspension according to the invention is suitable for vehicles, with a non-driven or a driven rear axle. The links may be connected to a simplified frame structure, which is connected to the vehicle body. This approach makes it possible for the vehicle producer to use identical body configurations and equipment for assembly on a production line where the 5-link suspension related to patent application WO 2008/053034 are used for vehicles having the engine at the front of the vehicle with a non-driven or driven rear axle.

The objects discussed above are also achieved by the motor device described herein and the appended claims.

BRIEF DESCRIPTION OF THE DRAWINGS

The invention is now to be explained more closely by means of the description of various embodiments, given only by way of example, and with reference to the drawings attached hereto.

DETAILED DESCRIPTION

Figure 1:
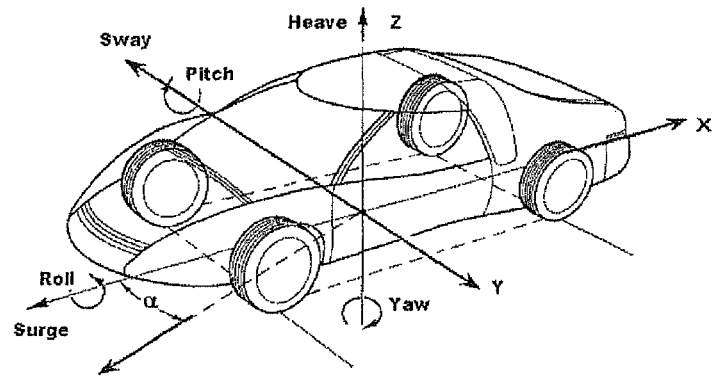
FIG. 1 shows schematically a perspective view of a motor vehicle indicating the six degrees of freedom of the vehicle.

FIG. 1 discloses the dynamics of a motor vehicle in six degrees of freedom denominated as follows:
Motion up and down=Heave;
Motion left and right=Sway;
Motion fore and aft=Surge;
Angular change around a horizontal lateral axis Y=Pitch;
Angular change around a vertical axis Z=Yaw; and
Angular change around a horizontal longitudinal axis X=Roll.

Figure 2:
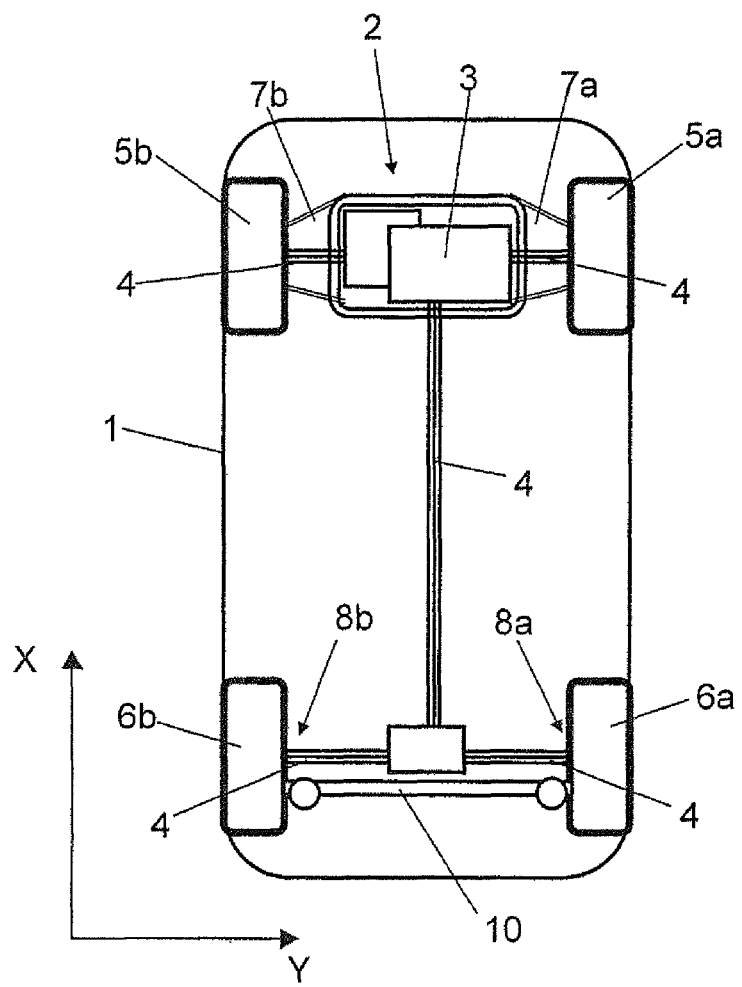
FIG. 2 shows schematically a view from above of a motor vehicle having rear wheel suspension according to the invention.
Figure 3:
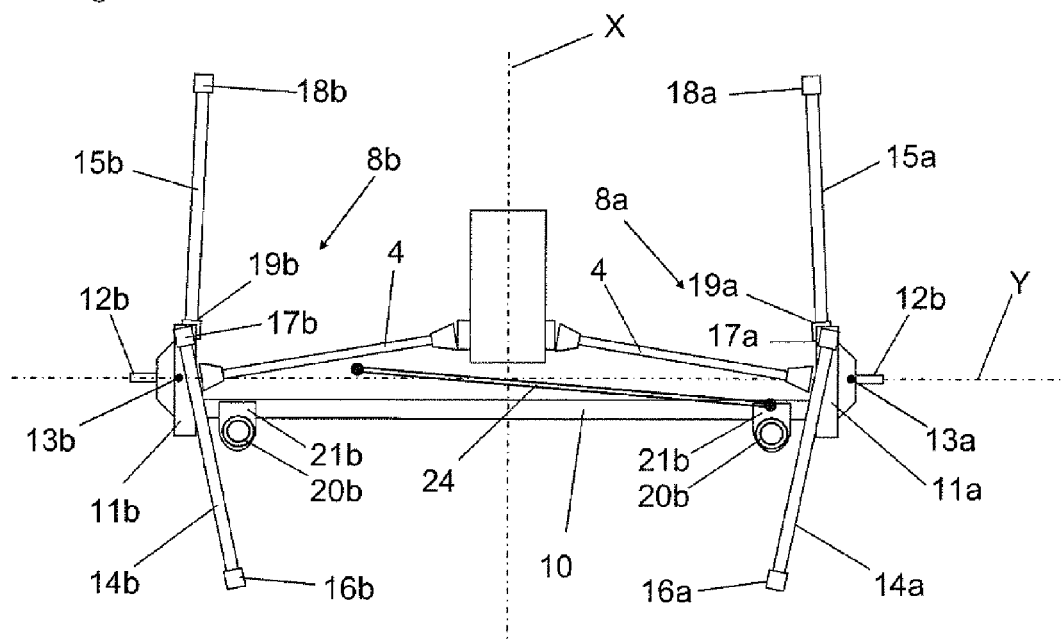
FIG. 3 shows schematically a view from above of a rear suspension according to the invention.

FIG. 2 discloses a motor vehicle comprising a vehicle body 1 and an engine-transmission system 2, comprising an engine 3 and a transmission comprising a number of different drive shafts 4. The engine 3 is in the embodiment disclosed provided at the front of the motor vehicle. The motor vehicle has two wheel suspensions, one front wheel suspension for the front wheels 5a, 5b, and one rear wheel suspension for the rear wheels 6a, 6b. The drive shafts 4 connect the transmission 3 to the wheels 5a, 5b, 6a, 6b with different driving configurations such as front-, rear- or all wheel drive of the motor vehicle. The front wheel suspension comprises a first suspension device 7a for the suspension of the right front wheel 5a and a second suspension device 7b for the suspension of the left front wheel 5b. The rear wheel suspension comprises a first suspension device 8a for suspension of the right rear wheel 6a and a second suspension device 8b for suspension of the left rear wheel 6b.

The rear wheel suspension is now to be explained more closely with reference to FIGS. 3-9. The rear wheel suspension defines the longitudinal axis X which is parallel with the normal forward driving direction of the motor vehicle. The rear wheel suspension also defines the vertical axis Z, which is perpendicular to the longitudinal axis X and vertical when the motor vehicle is in a normal driving state. Finally, the rear wheel suspension defines a lateral axis Y, which is perpendicular to the longitudinal axis X and to the vertical axis Z.

Figure 5:
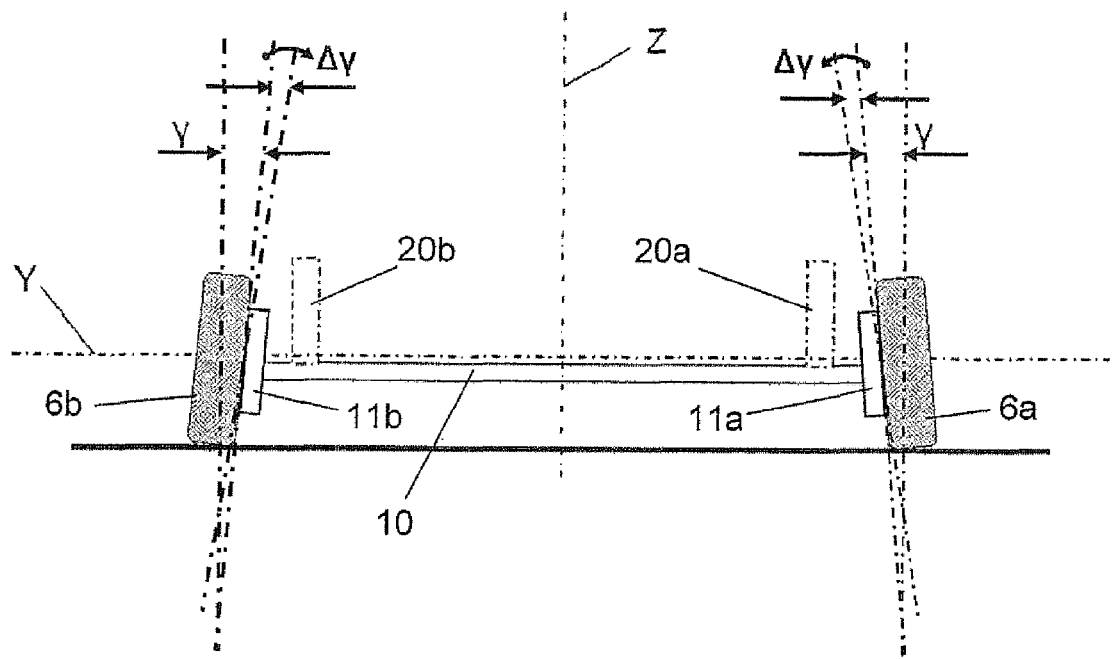
FIG. 5 shows schematically a rear view of parts of the rear suspension in FIG. 3 indicating the camber angle and the change of the camber angle.
Figure 6:
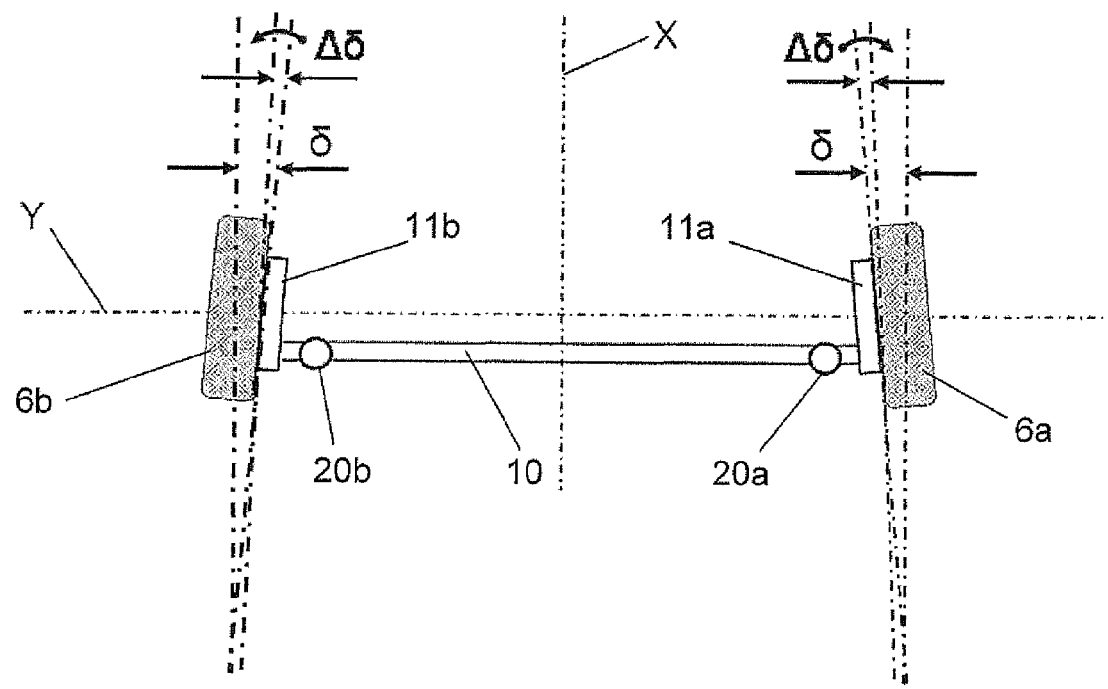
FIG. 6 shows schematically a top view of parts of the rear suspension in FIG. 3 indicating the toe angle and the change of the toe angle.

The first suspension device 8a of the rear suspension is configured to carry a right rear tire-wheel assembly having the right rear wheel 6a rotating in a first wheel plane forming a first toe angle $\delta$, see FIG. 6, with respect to the longitudinal axis X and a first camber angle $\gamma$, see FIG. 5, with respect to the vertical axis Z. The second suspension device 8b of the rear suspension is configured to carry a left rear tire-wheel assembly having a left rear wheel 6b rotating in a second wheel plane forming a second toe angle $\delta$, see FIG. 6, with respect to the longitudinal axis X and a second camber angle $\gamma$, see FIG. 5, with respect to the vertical axis Z.

The rear suspension also comprises a transversal beam 10 connecting the first suspension device 8a and the second suspension device 8b and extending along the lateral axis Y.

Each of the first and second suspension devices 8a, 8b comprises a wheel spindle housing 11a, 11b, attached to a respective end of the transversal beam 10. The wheel spindle housing 11a, 11b supports a wheel spindle 12a, 12b, on which the rear wheel 6a, 6b is to be mounted. The wheel spindle housing 11a, 11b defines a wheel centre 13a, 13b.

Each of the first and second suspension devices 8a, 8b also comprises a leading link 14a, 14b and a trailing link 15a, 15b. The leading link 14a, 14b is connected or attached to the vehicle body 1, or to a sub-frame, at a leading link vehicle position 16a, 16b by means of a suitable joint, and to the spindle housing 11a, 11b at a leading link attachment position 17a, 17b by means of a suitable joint. The trailing link 15a, 15b is connected or attached to the vehicle body 1, or to a sub-frame, at a trailing link vehicle position 18a, 18b by means of a suitable joint, and to the spindle housing 11a, 11b and/or to a bracket (not disclosed in the figures) on the transversal beam 10 at a trailing link attachment position 19a, 19b by means of a suitable joint.

Figure 4:
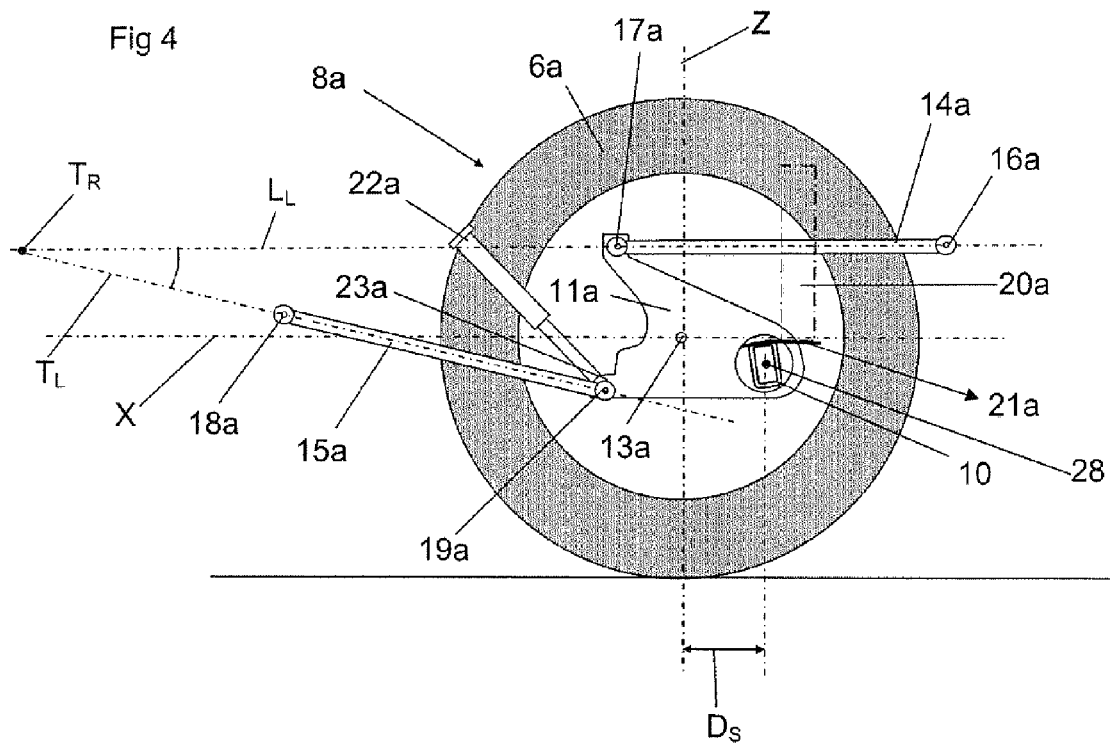
FIG. 4 shows schematically a side view of a suspension device of the rear suspension in FIG. 3.

The leading link 14a, 14b extends rearwards from the leading link attachment position 17a, 17b with respect to the longitudinal axis X along a leading link direction $L_L$. The trailing link 15a, 15b extends forwards from the trailing link attachment position 19a, 19b with respect to the longitudinal axis X along a leading link direction $T_L$. As can be seen in FIG. 4, the trailing link direction $T_L$ and the leading link $L_L$ direction converge towards a transversal line $T_R$ forward of the wheel centre 13a, 13b at least when the vehicle is in a static state or a normal design load position. The transversal line $T_R$ is located above the wheel centre 13a, 13b.

The leading link attachment position 17a, 17b is higher than the trailing link attachment position 19a, 19b, as can be seen in FIG. 4. The leading link attachment position 17a, 17b is also positioned above the wheel centre 13a, 13b, whereas the trailing link attachment position 19a, 19b is positioned below the wheel centre 13a, 13b.

Each of the first and second suspension devices 8a, 8b comprises a rear vehicle spring 20a, 20b for carrying a part of the weight of the vehicle body 1. The vehicle spring 20a, 20b is supported by or provided on a vehicle spring attachment 21a, 21b. The vehicle spring attachment 21a, 21b is provided behind the wheel centre 13a, 13b. Moreover, in the embodiments disclosed the vehicle spring attachment 21a, 21b is provided on the transversal beam 10.

Each of the first and second suspension devices 8a, 8b also comprises a rear shock absorber 22a, only one of which is disclosed. The shock absorber 22a is, in the embodiments disclosed, attached to the wheel spindle housing 11a, 11b at an absorber attachment position 23a by means of any suitable joint.

Figure 10:
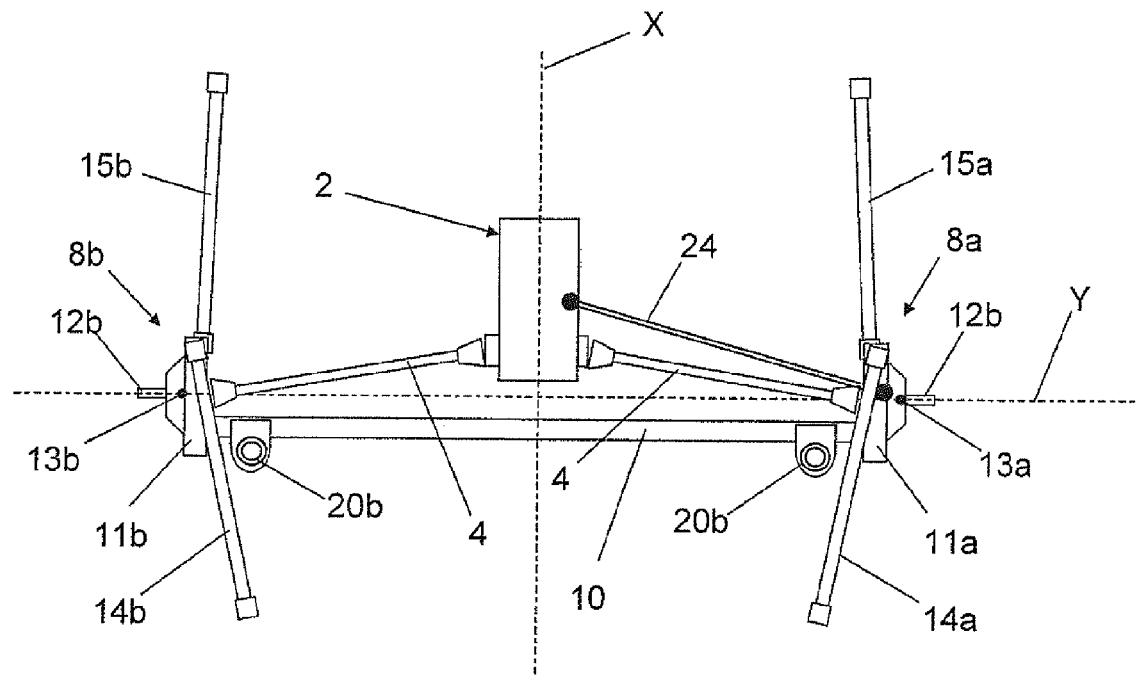
FIG. 10 shows schematically a view from above of the rear suspension having an alternative lateral link arrangement.
Figure 11:
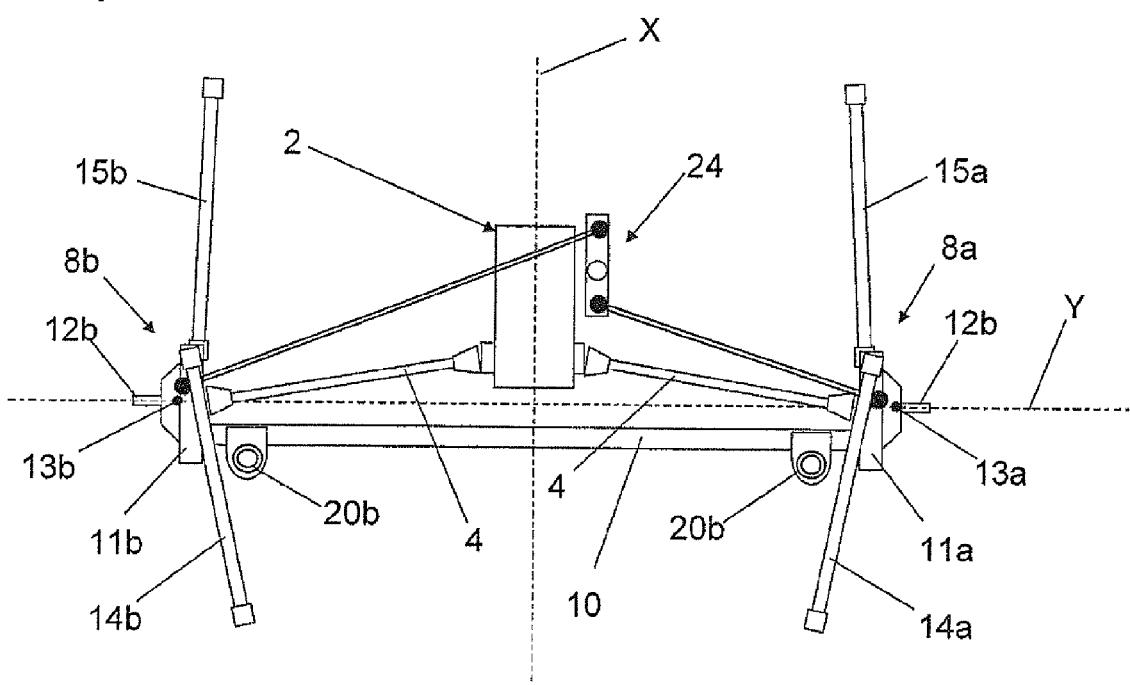
FIG. 11 shows schematically a view from above of the rear suspension having another alternative lateral link arrangement.

The rear wheel suspension also comprises a lateral link arrangement 24 for transmitting lateral forces acting between the vehicle body 1 and the rear wheel suspension connected to the rear wheels 6a, 6b. In the embodiment disclosed in FIG. 3, the lateral link arrangement 24 comprises a so called Panhard rod connecting the rear wheel suspension to the vehicle body 1 or to a sub-frame. FIG. 10 illustrates another lateral link arrangement 24 comprising a so called Scott-Russell-linkage having a rod attached to the right wheel spindle housing 11a and to the vehicle body 1 or a sub-frame for the rear transmission differential of the engine-transmission system 2. FIG. 11 illustrates a further alternative of the lateral link arrangement 24 comprising a so called Watt-linkage having pivot rod attached to the vehicle body 1 or a sub-frame. A first rod is attached to one end of the pivot rod and to the right wheel spindle housing 11a. A second rod is attached to the other end of the pivot rod and to the left wheel spindle housing 11b.

Figure 7:
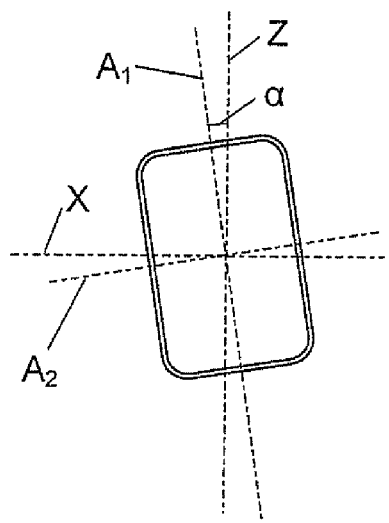
FIG. 7 shows schematically a sectional view through a first variant of a transversal beam of the rear suspension in FIG. 3.
Figure 8:
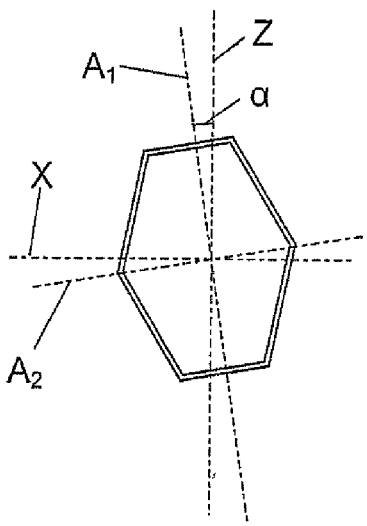
FIG. 8 shows schematically a sectional view through a second variant of a transversal beam of the rear suspension in FIG. 3.
Figure 9:
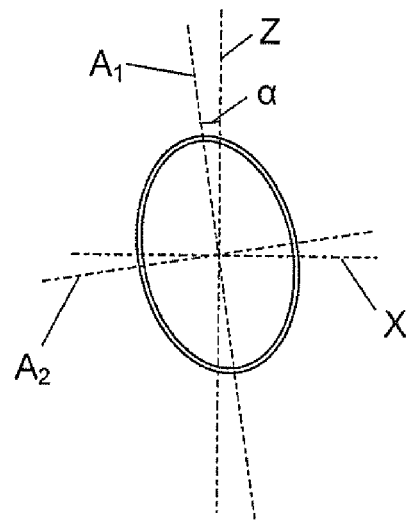
FIG. 9 shows schematically a sectional view through a third variant of a transversal beam of the rear suspension in FIG. 3.

The transversal beam 10 is fixedly or immovably attached to the wheel spindle housings 11a, 11b of the first and second suspensions devices 8a, 8b. The transversal beam 10, see FIGS. 7-9, has cross-sectional shape defining a first main axis of inertia $A_1$ and a second main axis of inertia $A_2$. The first main axis of inertia $A_1$ is perpendicular to the second main axis of inertia $A_2$. The transversal beam 10 has a higher bending stiffness, or higher geometric moment of inertia, for a bending around the second main axis of inertia $A_2$ than for a bending around the first main axis of inertia $A_1$. As illustrated in FIGS. 7-9, the first main axis of inertia $A_1$ is inclined forwardly to form an acute angle $\alpha$ to the vertical axis Z. The acute angle $\alpha$ is greater than zero, and less than 20°, preferably less than 15°, and more preferably less than 10°.

In the embodiments disclosed, the transversal beam 10 is hollow or tubular. Such configuration results in a low weight of the transversal beam 10. The variant of the transversal beam 10 shown in FIG. 7 has a rectangular cross-sectional shape. The variant of the transversal beam 10 shown in FIG. 8 has a hexagonal cross-sectional shape, and the variant in FIG. 9 has an elliptic or oval shape. It is to be noted that also other cross-sectional shapes are possible for fulfilling the requirement a higher bending stiffness, or higher geometric moment of inertia, for a bending around the second main axis of inertia $A_2$ than for a bending around the first main axis of inertia $A_1$. The cross-sectional shape or dimension of the transversal beam 10 may also vary along the lateral axis Y.

Moreover, in the embodiments disclosed, the transversal beam 10 is straight or substantially straight along its extension along the lateral axis Y. However, the transversal beam 10 may have another shape along the lateral axis Y, for instance the transversal beam 10 may be curved, or slightly curved. The transversal beam 10 has or defines a shear centre line 28 along the extension between the wheel spindle housings 11a, 11b. The shear centre line 28 of the transversal beam is provided at a distance $D_s$ from and behind the wheel centre 13a, 13b along the whole extension of the transversal beam 10, see FIG. 4.

The transversal beam 10 is configured to permit a bending of the transversal beam 10 for vertical loads to provide the first suspension device 8a and the second suspension device 8b a deflection in a direction along the longitudinal axis X to adjust the first and second, respectively, toe angle δ, and in a direction along the vertical axis Z to adjust the first and second, respectively, camber angle γ. The deflection of the wheel spindle housings 11a, 11b is such that the changes Δγ of the first and second camber angles γ when the first and second wheel planes converge towards an upper point above the wheel centre 13a, 13b of each of the first and second suspension devices 8a, 8b connect to an adjustment, or controlled adjustment, Δδ of the first and second toe angles δ such that the first and second wheel planes converge directionally towards a rear point located rearwards of the wheel centre 13a, 13b of each of the first and second suspension devices 8a, 8b.

The transversal beam 10 will thus permit a determined bending in a determined direction. The bending will change the camber angle γ and as a consequence of this change also adjust the toe angle δ of the rear wheels 6a, 6b thanks to the configuration of the transversal beam 10 and to the fact that the transversal beam 10 is attached to the first and second suspension devices 8a, 8b. The change Δγ of the camber angle γ is thus coupled to a controlled adjustment Δδ of the toe angle δ. As illustrated in FIG. 5, the camber angle γ is negative in a static state and in a normal design load position. The toe angle δ is at toe-in in the static state, for instance a toe-in of 0.05-0.25°, such as a total axle toe-in of 0.3°, or for each side approximately 0.15°.

There is a first relation between the adjustment Δδ of the first toe angle δ and the change Δγ of the first camber angle γ, and a second relation between the adjustment Δδ of the second toe angle δ and the change Δγ of the second camber angle γ. Each of the first and second relations forms a ratio Δδ/Δγ that is maintained within a determined interval upon a vertical load on the vehicle when travelling straight ahead. The determined interval of the ratio Δδ/Δγ is 0.01 to 0.25, preferably, 0.015 to 0.1, more preferably 0.015 to 0.05, and most preferably approximately 0.035.

Figure 12:
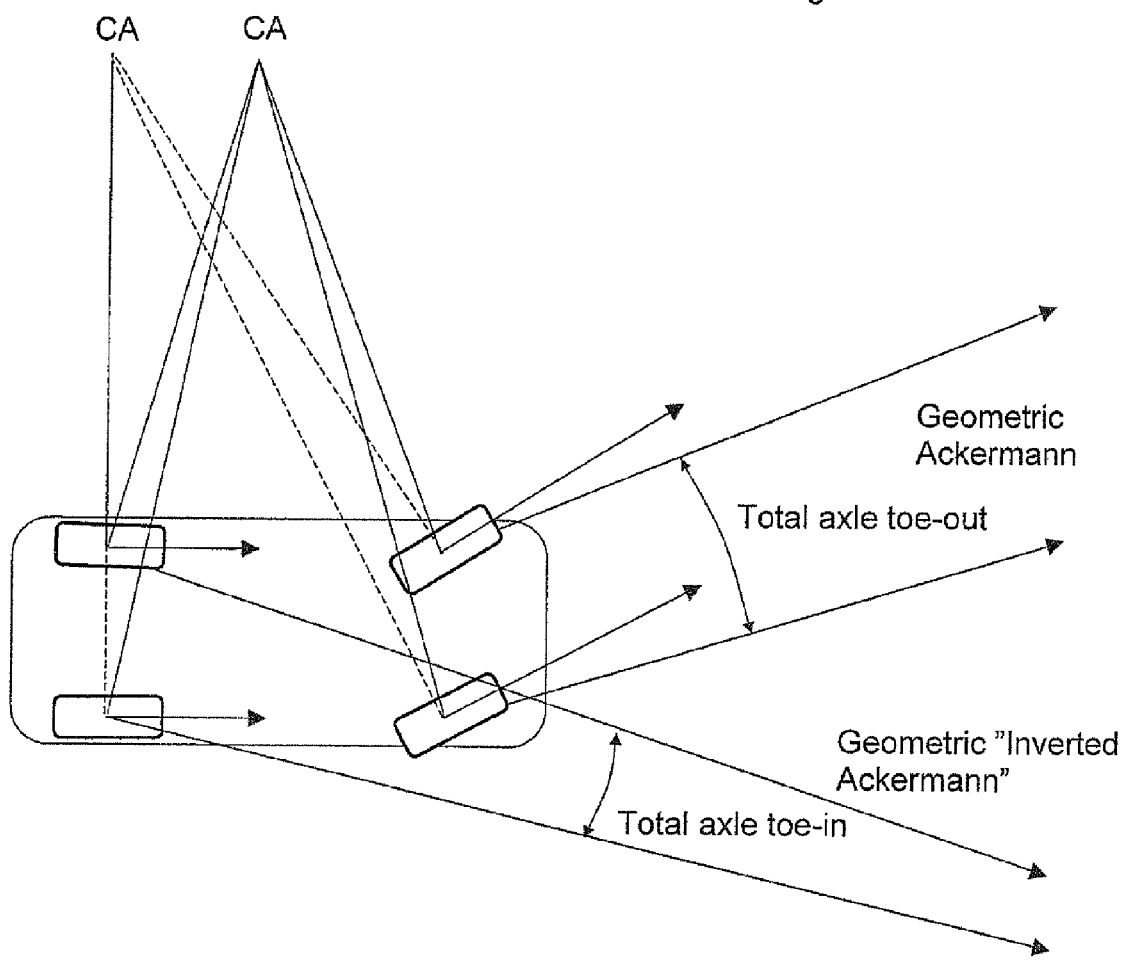
FIG. 12 shows a view from above of a motor vehicle having the rear suspension device travelling through a curve.

With reference to FIGS. 6 and 12, it can be seen that the bending of the transversal beam 10 also comprises the deflection along the longitudinal axis X to adjust the directions of the first toe angle δ and the second toe angle δ to turn directionally towards a common forward point located forwards of the wheel centre 13a, 13b when the vehicle is travelling through a curve. In the example disclosed in FIG. 12, the motor vehicle turns to the left. The left rear wheel 6b will be at toe-in and the right rear wheel 6a will be at toe-out. The absolute angle value of the toe-in of the left rear wheel 6b is greater than the absolute angle value of the right rear wheel 6a. There will thus be a total axle toe-in for the rear wheels 6a, 6b. This effect is accomplished thanks to the configuration of the rear wheel suspension and in particular to the configuration of the transversal beam 10, which, while being fixedly or immovably attached to the wheel spindle housings 11a, 11b, permits this bending when lateral forces act on the rear wheels 6a, 6b during travelling through a curve. Due to the mutual total axle toe-out for the front wheels 5a, 5b, the lateral action of the rear wheels 6a, 6b will be synchronized towards a centre of action CA, or instantaneous centre of action or instantaneous turn centre, common to the rear wheels 6a, 6b and the front wheels 5a, 5b when the motor vehicle travels through a curve, thus providing the above-mentioned Geometric "Inverted Ackermann" as illustrated in FIG. 12.

The present invention is not limited to the embodiments disclosed but may be varied and modified within the scope of the following claims.

What is claimed is:

1. A rear wheel suspension configured for a motor vehicle having a vehicle body, the rear wheel suspension defining a longitudinal axis configured to be parallel with the normal forward driving direction of the motor vehicle, a vertical axis being perpendicular to the longitudinal axis, and configured to be vertical when the motor vehicle is in a normal driving state, and a lateral axis being perpendicular to the longitudinal axis and the vertical axis, the rear wheel suspension comprising:
a first suspension device configured to carry a right rear tire-wheel assembly having a right rear wheel rotating in a first wheel plane forming a first toe angle with respect to the longitudinal axis and a first camber angle with respect to the vertical axis,
a second suspension device configured to carry a left rear tire-wheel assembly having a left rear wheel rotating in a second wheel plane forming a second toe angle with respect to the longitudinal axis and a second camber angle with respect to the vertical axis, and
a transversal beam connecting and attached to the first suspension device and the second suspension device and extending along the lateral axis,
each of the first and second suspension devices comprising
a wheel spindle housing, attached to a respective end of the transversal beam and adapted to support a wheel spindle, on which the rear wheel is mountable, and defining a wheel centre,
a leading link adapted to be connected to the vehicle body, and
a trailing link adapted to be connected to the vehicle body,
wherein the transversal beam is configured to permit a bending to provide the first and second suspension devices a deflection in a direction along the longitudinal axis to adjust the first and second, respectively, toe angle, and in a direction along the vertical axis to adjust the first and second, respectively, camber angle such that the changes of the first and second camber angles, when the first and second wheel planes converge towards an upper point above the wheel centre of each of the first and second suspension devices, connect to a controlled adjustment of the first and second toe angles such that the first and second wheel planes converge directionally towards a rear point located rearwards of the wheel centre of each of the first and second suspension devices,
wherein the transversal beam has cross-sectional shape defining a first main axis of inertia and a second main axis of inertia, the first main axis of inertia being perpendicular to the second main axis of inertia, and wherein the transversal beam has a higher bending stiffness for a bending around the second main axis of inertia than for a bending around the first main axis of inertia.

2. A rear wheel suspension according to claim 1, wherein a first relation between the controlled adjustment of the first toe angle and the change of the first camber angle and a second relation between the adjustment of the second toe angle and the change of the second camber angle form a ratio that is maintained within a determined interval upon a vertical load on the vehicle when travelling straight ahead.

3. A rear wheel suspension according to claim 2, wherein the determined interval is 0.01 to 0.25.

4. A rear wheel suspension according to claim 1, wherein said bending comprises the deflection along the longitudinal axis to adjust the directions of the first toe angle and the second toe angle to turn directionally towards a common forward point located forwards of the wheel centre when the motor vehicle is travelling through a curve.

5. A rear wheel suspension according to claim 1, wherein the first main axis of inertia is inclined forwardly to form an acute angle to the vertical axis.

6. A rear vehicle suspension according to claim 1, wherein the transversal beam has a shear centre line, which is provided at a distance from and behind the wheel centre.

7. A rear wheel suspension according to claim 1, wherein the leading link extends along a leading link direction and the trailing link extends along a trailing link direction, and wherein the trailing link direction and the leading link direction converge towards a transversal line forward of the wheel centre at least when the vehicle is in a normal design load position.

8. A rear wheel suspension according to claim 7, wherein said transversal line is located above the wheel centre.

9. A rear wheel suspension according to claim 1, wherein
the leading link extends rearwards from a leading link attachment position with respect to the longitudinal axis,
the trailing link extends forwards from a trailing link attachment position with respect to the longitudinal axis, and
the leading link attachment position is higher than the trailing link attachment position.

10. A rear wheel suspension according to claim 9, wherein the leading link attachment position is positioned above the wheel centre and the trailing link attachment position is positioned below the wheel centre.

11. A rear wheel suspension according to claim 1, wherein each of the first and second suspension devices comprises a rear vehicle spring for carrying a part of the weight of the vehicle body and a vehicle spring attachment configured for supporting the rear vehicle spring, and wherein the vehicle spring attachment is provided behind the wheel centre.

12. A rear wheel suspension according to claim 1, wherein the rear wheel suspension comprises a lateral link arrangement for absorbing lateral forces acting on the vehicle body and on the rear wheels.

13. A rear wheel suspension according to claim 12, wherein the lateral link arrangement comprises one of a Panhard rod, Scott-Russell-linkage or a Watt-linkage.

14. A motor vehicle comprising a rear wheel suspension according to claim 1.

* * * * *